United States Patent [19]
Winston et al.

[11] Patent Number: 5,971,551
[45] Date of Patent: Oct. 26, 1999

[54] NONIMAGING OPTICAL CONCENTRATORS AND ILLUMINATORS

[75] Inventors: Roland Winston; David Gerard Jenkins, both of Chicago, Ill.

[73] Assignee: ARCH Development Corporation, Chicago, Ill.

[21] Appl. No.: 08/499,403

[22] Filed: Jul. 7, 1995

[51] Int. Cl.⁶ .................................. G02B 5/10; F24J 2/10
[52] U.S. Cl. .......................... 359/868; 359/869; 359/853; 126/683; 126/684; 126/691
[58] Field of Search ...................... 359/851, 853, 359/868, 869, 364, 726, 727, 730; 126/683, 684, 688, 689, 690, 691, 692, 693, 694, 695, 698

[56] References Cited

U.S. PATENT DOCUMENTS

| | | |
|---|---|---|
| 3,923,381 | 12/1975 | Winston . |
| 3,957,031 | 5/1976 | Winston . |
| 4,003,638 | 1/1977 | Winston . |
| 4,045,246 | 8/1977 | Winston . |
| 4,114,592 | 9/1978 | Winston . |
| 4,130,107 | 12/1978 | Winston . |
| 4,237,332 | 12/1980 | Winston . |
| 4,240,692 | 12/1980 | Winston . |
| 4,359,265 | 11/1982 | Winston . |
| 4,387,961 | 6/1983 | Winston . |
| 4,669,832 | 6/1987 | Wolken . |
| 5,243,459 | 9/1993 | Winston et al. ..................... 359/853 |

*Primary Examiner*—Ricky D. Shafer
*Attorney, Agent, or Firm*—Michael D. Rechtin; Foley & Lardner

[57] ABSTRACT

A nonimaging concentrator (or illuminator) of light. The concentrator (or illuminator) has a shape defined by $dR/d\phi = R\tan\alpha$ where R is a radius vetor from an origin to a point of reflection of a light edge ray from a reflector surface and $\phi$ is an angle between the R vector and an exit aperture external point of the concentrator (illuminator) and coordinates $(R, \phi)$ represent a point on a reflector curve and $\alpha$ is an angle the light edge ray from an origin point makes with a normal to the reflector curve. The reflector surface allows the light edge ray on the reflector curve to vary as a function of position. In the concentrator an absorber has a shape variable which varies with position along the absorber surface.

13 Claims, 13 Drawing Sheets

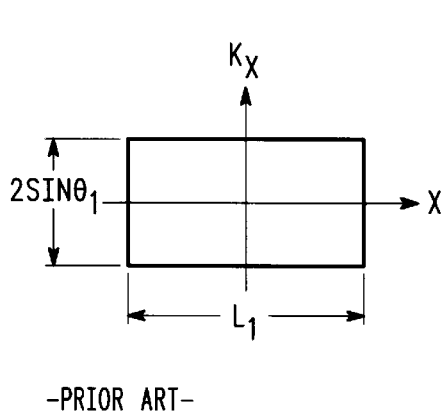
-PRIOR ART-
Fig. 1A
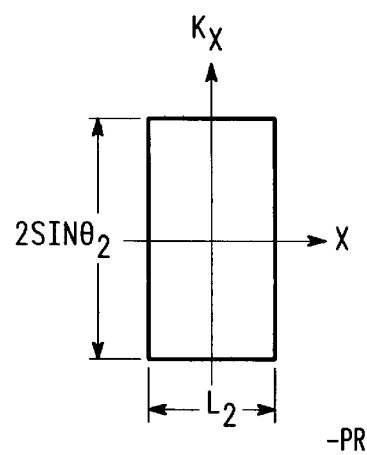
-PRIOR ART-
Fig. 1B
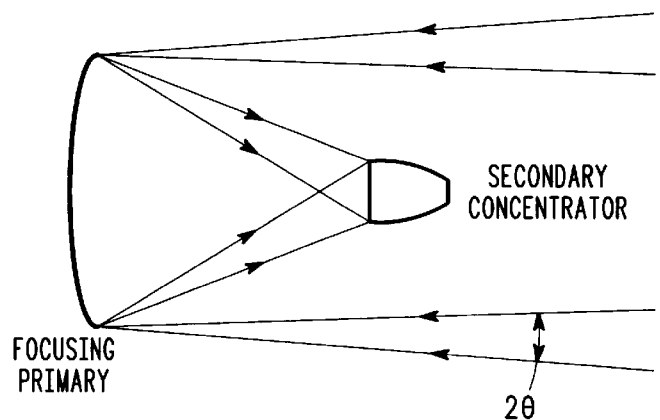
Fig. 2
-PRIOR ART-
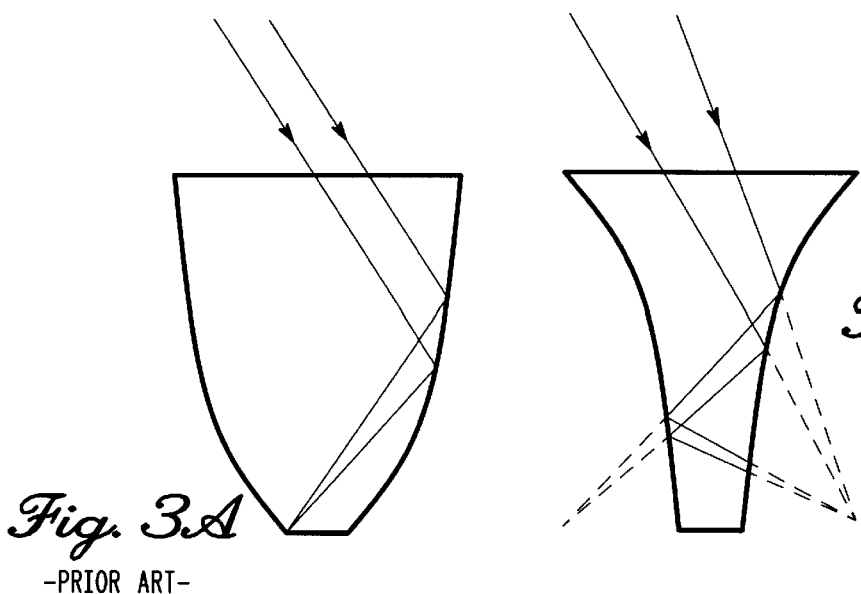
Fig. 3B
-PRIOR ART-
Fig. 3A
-PRIOR ART-

—PRIOR ART—

NONIMAGING OPTICAL CONCENTRATORS AND ILLUMINATORS

The present invention is concerned generally with a method and design of nonimaging optical concentrators and illuminators. More particularly, the invention is concerned with a method and design for transforming input and output phase space distributions to obtain optimum concentration for a given absorber shape. In addition, the invention is concerned particularly with use of a tailored reflector providing nonimaging illumination of general illuminance patterns onto a target plane (illuminence is radiance weighted by photo-optic response, or any desired wavelength weighted response).

Nonimaging concentrators and their advantages are well known in the art (see, for example, U.S. Pat. Nos. 3,957,031; 4,002,499; 4,003,638; 4,230,095; 4,387,961; 4,359,265 and 5,289,356 incorporated by reference herein). In these previous devices a given absorber shape is selected and then an appropriate matching nonimaging reflector was designed. Emphasis has been on developing new reflector designs, but these efforts have been unable to improve efficiency levels to any substantial extent without use of designs which are expensive to manufacture.

Nonimaging optics is a field that is concerned with achieving maximum concentration of light or controlled illumination of light on a target. The techniques of many types of concentrator systems are well established. These systems include $\theta_1$–$\theta_2$ concentrators, trumpets, and compound parabolic concentrators (CPCs). The problem addressed by these systems is that a flat input brightness distribution or phase space is transformed onto an absorber. Phase space conservation is required between what is collected from the entrance aperture to what strikes the absorber. Diagrams of the phase space of a flat distribution on the aperture and absorber allow a simple calculation of ideal concentration. As shown in FIG. 1, the concentrator accepts all rays on the entrance aperture of dimension $L_1$ which are incident with angle less than $\theta_1$, while the exit aperture of dimension $L_2$ emits rays within a cone of angle $\theta_2$. Requiring that the area of each square be conserved gives a relation between the exit aperture $L_2$ versus the entrance aperture $L_1$:

$$L_2 = L_1 \frac{\sin\theta_1}{\sin\theta_2} \quad (1)$$

For maximal concentration ($\theta_2 = \pi/2$), the limit inside an index of refraction n in two dimensions is, $$C_{2-d} = \frac{n}{\sin\theta_1} \quad (2)$$

and in three dimensions is, $$C_{3-d} = \frac{n^2}{\sin^2\theta_1} \quad (3)$$

These concentrators are impractical at small acceptance angles because their length is proportional to cot $\theta_1$ unless a lens is used at the entrance. Also, designs have been developed using two-stage systems. These have an imaging primary mirror or lens that greatly decreases the length of the system but also causes concentration to fall below the ideal limit. For a two-stage system with focusing primary and a nonimaging concentrator with a fixed acceptance angle, as shown in FIG. 2, one finds that the theoretical limit is, $$C_{2-d} = \frac{n\cos\phi_{rim}}{\sin\theta_1} \quad (4)$$

where $\phi_{rim}$ is the rim angle of the imaging primary. For large rim angles, the fall off in concentration is quite drastic. The problem that causes the loss is that the brightness distribution onto the secondary aperture in such a system is very non-uniform. The standard secondary, however, is designed to collect a flat phase space, and much that is collected is not desired. Recent developments have shown that tailoring a concentrator is possible and allows the above limit to be exceeded in some cases. There has not been a generalized technique to accomplish this for various types of concentrators.

In part the instant invention concerns use of a general numerical integration method to design concentrators for various absorbers shapes and input distributions. This method can use a polar coordinate differential equation to determine a reflector curve that allows the edge ray on the reflector to vary as a function of position. Also, the shape of the absorber can be accounted for by changing one parameter within the equation that depends on absorber shape and may also vary with position.

There are two types of curvature that are typically used for designing nonimaging concentrators. The most common is a compound elliptical concentrator (CEC) and uses an edge ray algorithm that arrives on the absorber in one reflection, while the hyperbolic concentrator (CHC) uses "virtual" foci that cause edge rays to make multiple reflections before hitting the target absorber. The compound reflector derives from the presence of two sides to a concentrator and generally dictates that the design of one side is symmetric relative to the other. The two types shown in FIG. 3 are both designable using a general integral design method.

Likewise, a variety of methods and designs exist for producing nonimaging illumination systems, but the proposed solutions require highly specialized conditions to operate efficiently, such as requiring a large gap between the source and reflector profile or requiring the reflector shape to be much larger than the source of light.

It is therefore an object of the invention to provide an improved method and design for a nonimaging optical concentrator or illuminator.

It is another object of the invention to provide a novel general method for generating a concentrator design given a variety of absorber shapes and light input distributions.

It is also an object of the invention to provide an improved method of designing a concentrator having a reflector curve which varies as a function of the brightness or light distribution at a given spatial position.

It is yet another object of the invention to provide a novel method of designing a light concentrator by varying one parameter in an analytical expression which depends on absorber shape.

It is a further object of the invention to provide an improved method for designing a compound concentrator using a general analytical procedure to construct both sides of the concentrator.

It is an additional object of the invention to provide a novel design for a concentrator using an analytical differential equation to determine a reflector curve which allows an edge ray on the reflector to vary as a function of position.

It is also an object of the invention to provide an improved concentrator design using a defined complementary edge ray to simplify the geometrical design.

It is still another object of the invention to provide an improved two-stage concentrator system using a fixed circular mirror.

It is in addition an object of the invention to provide a novel method and design for a tailored reflector for a nonimaging illumination system.

It is also an object of the invention to provide an improved method and design for providing a tailored reflector producing general illumination patterns on a target plane.

It is a further object of the invention to provide a novel method and design for using a leading reflector edge approach in creating an illuminator.

It is still an additional object of the invention to provide an improved method and design for a nonimaging illumination system without need for any gap between light source and reflector.

It is yet another object of the invention to provide a novel method and design for a nonimaging illumination system using an analytical expression applied to three integration regions of an angular integration variable.

These and other objects and advantages of the invention will be apparent from the detailed description and drawings described herein below.

BRIEF DESCRIPTION OF THE DRAWINGS

FIGS. 1(a) and 1(b) illustrate a brightness transformation of a prior art typical nonimaging concentrator;

FIG. 2 shows a prior art two-stage concentrating system;

FIG. 3 illustrates two different types of concentrators: FIG. 3(a) CEC-type and FIG. 3(b) CHC-type;

FIG. 5 illustrates designs of a $\theta_1-\theta_2$ type concentrator.

DETAILED DESCRIPTION OF PREFERRED EMBODIMENTS

A. Nonimaging Concentrators.

Figure 4:
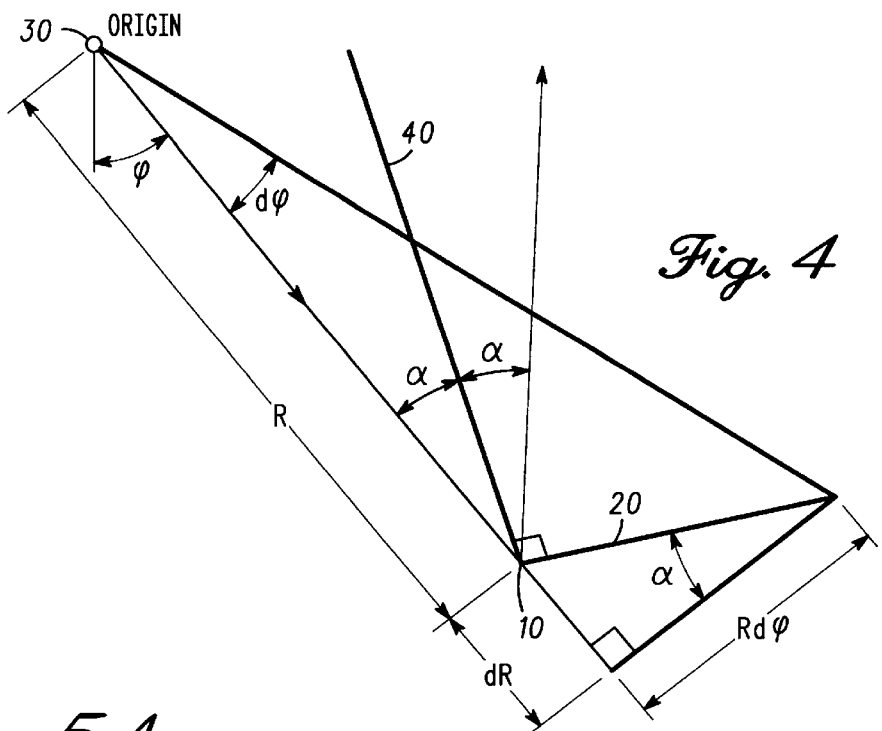
FIG. 4 illustrates in a polar coordinate system a ray from an origin reflecting off a reflector curve.

The method and design of nonimaging concentrators constructed in accordance with the invention are shown generally in FIGS. 4–15 and 17–25. The preferred aspects of the invention will be described in the context of designs for two-dimensional concentrators using polar coordinates. Three-dimensional concentrators can be created by rotating the two-dimensional design around its axis. Each shape regardless of the actual absorber shape is derived from integrating a differential equation of polar coordinates. This equation is given by, $$\frac{dR}{d\phi} = R \tan\alpha \tag{5}$$

where the coordinates (R,$\phi$) represent a point 10 on a curve 20, while $\alpha$ is the angle a ray from an origin 30 of the coordinate system makes with normal 40 to the curve 20. This system is depicted in FIG. 4. Designing various nonimaging concentrators therefore requires a convenient origin and finding $\alpha(R,\phi)$ to satisfy the edge-ray principle.

1. $\theta_1-\theta_2$ Design

Figure 5A:
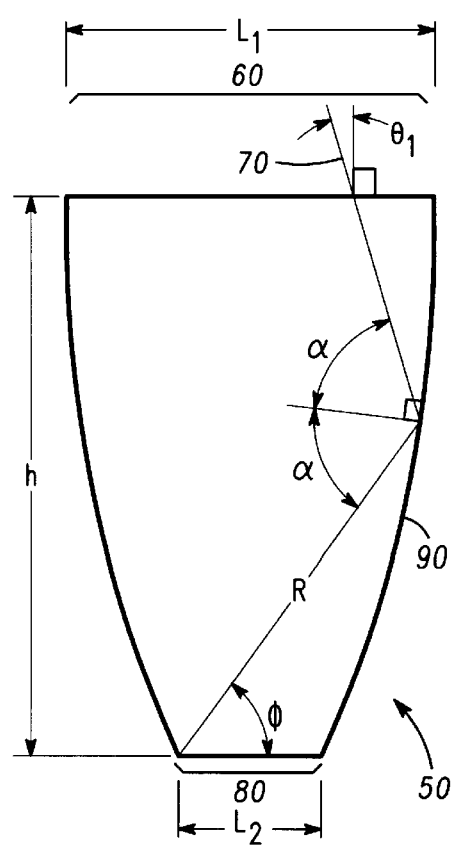
FIG. 5(a) $\phi > \pi/2 - \theta_2$.

The simplest type of concentrator 50 to design has edge rays from a source entrance aperture 60 that reflects to real points on a target exit aperture 80 (see FIG. 5). This is a CEC-type of the concentrator 50 since edge ray 70 makes one reflection in reaching the target exit aperture 80. For flat phase space distributions with a maximum angle of $\theta_1$ hitting the entrance aperture 60 and $\theta_2$ leaving the exit aperture 80, one has the classic $\theta_1-\theta_2$ CPC. Since the design of this type of the concentrator 50 has most of the edge rays 70 hitting the ends of the target exit aperture 80, this is the optimal choice for coordinate origin. FIG. 5(a) shows the concentrator profile and the various design parameters for $\theta_2 > \pi/2 - \phi$. In this case, the edge ray 70 hits the edge of the target exit aperture 80. The only new parameter entering is $\theta_1(R,\phi)$. This is the largest angle edge ray 70 can make with the vertical that can hit reflector 90 at point R,$\phi$. For standard prior art designs $\theta_1(R,\phi)$ is a constant for all R,$\phi$. Once $\theta_1$ is known, alpha is found using simple geometry to be, $$\alpha = \frac{\pi}{4} + \frac{\phi - \theta_1(R,\phi)}{2}, \text{ if } \theta_2 > \frac{\pi}{2} - \phi \tag{6}$$

When combined with Eqn. 5 the solution is analytically difficult to solve unless $\theta_1$ is constant or proportional to $\phi$ (i.e., a linear function of $\phi$).

Figure 5B:
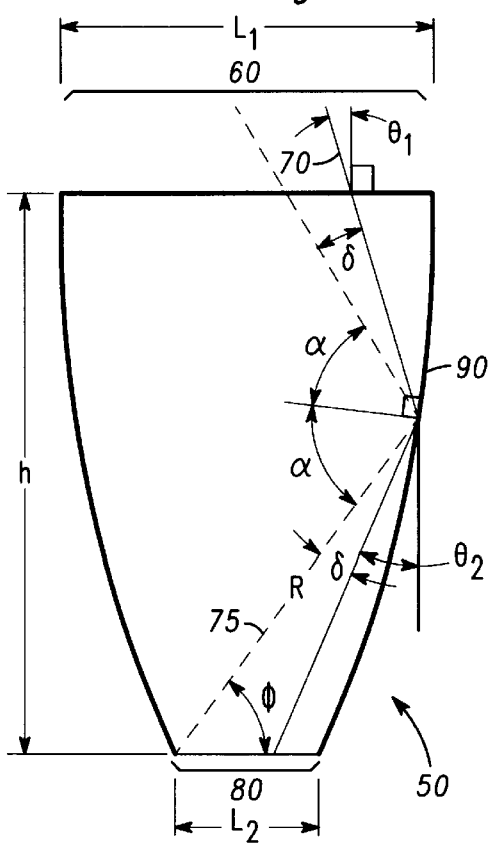
FIG. 5(b) $\phi \leq \pi/2 - \theta_2$.

If $\theta_2 \leq \pi/2 - \phi$, finding alpha is more complicated since the edge ray 70 doesn't hit the edge of the target exit aperture 80, as shown in FIG. 5(b). To cause the edge ray 70 to exit at angle $\theta_2$, one introduces a complementary edge ray 75 that passes through the edge of the target exit aperture 80. Defining a new quantity $\delta = \pi/2 - \phi - \theta_2$ and adding it to $\theta_1$ in Eqn. 6 gives the correct value for $\alpha$. By requiring the complementary edge ray 75 at $\theta_1 + \delta$ hits the edge of the target exit aperture 80, the real edge ray 70 at $\theta_1$ exits the target exit aperture 80 with angle $\theta_2$. The complementary edge ray 75 corresponds to the constructed ray passing through the design origin which causes the edge ray 70 to exit with the correct output angle $\theta_2$. The equation for alpha in this case is, $$\alpha = \phi + \frac{\theta_2 - \theta_1(R, \phi)}{2}, \text{ if } \theta_2 \leq \frac{\pi}{2} - \phi \qquad (7)$$

If $\theta_1$ is a constant this equation integrates to a straight line.

Figure 6:
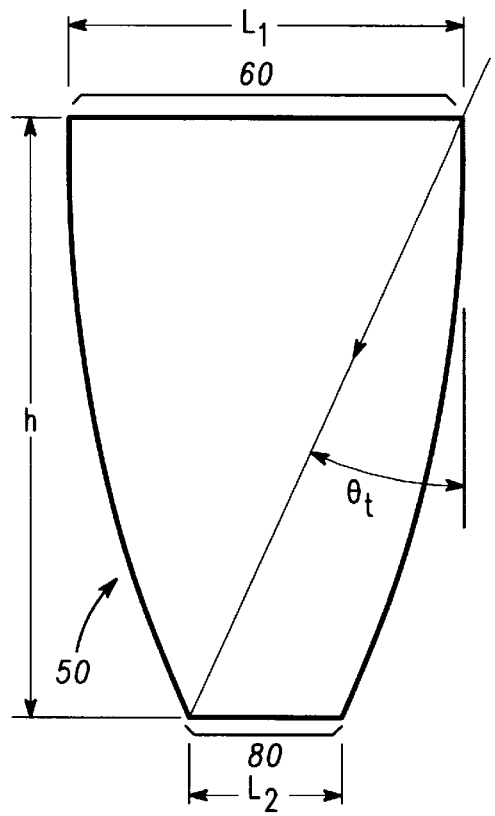
FIG. 6 illustrates determination of height h from the truncation angle $\theta_t$.

Determining the height h and size of the exit aperture $L_2$ (80) analytically assuming that the input distribution is known, i.e. $L_1$ fixed, is not possible for most cases. The concentration is generally not known beforehand since gaps in the phase space distribution at the input may have to be included, resulting in less than ideal collection. In the concentrator 50 of FIG. 6 is illustrated how to determine h in terms of $L_2$ and $L_1$. In FIG. 6 the truncation angle $\theta_t$ is the angle of the edge ray from the end of the source 60. From basic trigonometry, $$h = \left(\frac{L_1}{2} + \frac{L_2}{2}\right) \cot \theta_t \qquad (8)$$

while varying the concentration $L_1/L_2$. Preferably $L_1$ is fixed, and $L_2$ is varied because source size is generally fixed. Integration can be done starting from either the edge of the source or the target exit aperture 80. The concentration is an unknown parameter and thus must be solved for. Use of standard numerical computation algorithms can be used to require the integrated curve to pass through both edges of the source and the target exit aperture 80. If h is fixed, then in general there will be losses in concentration. Also, designing for a non-flat output brightness distribution can be done by making $\theta_2$ a function of R,$\phi$.

2. Trumpet Concentrator Design

Figure 7:
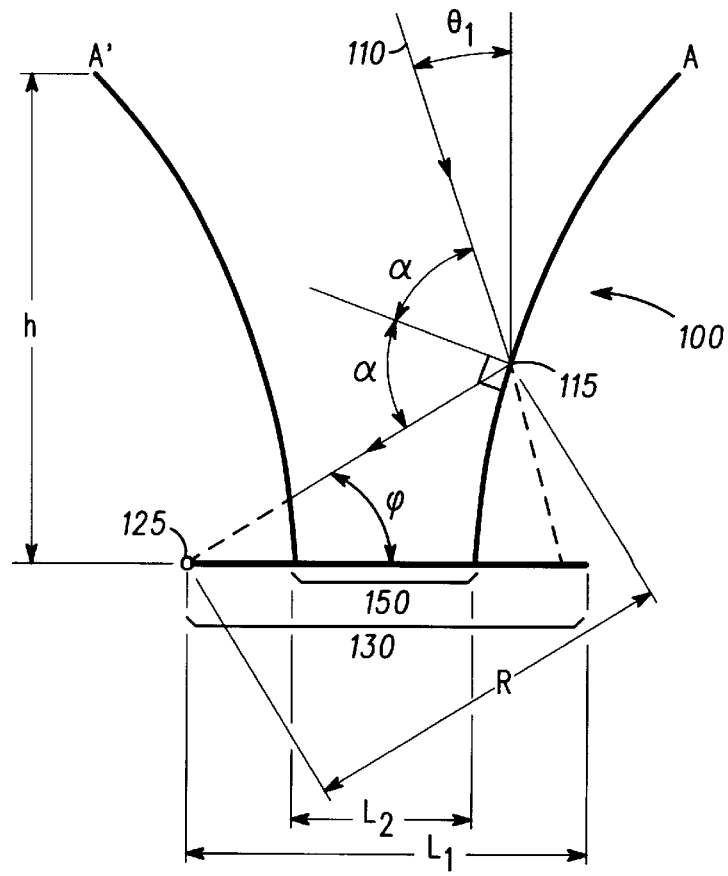
FIG. 7 illustrates use of a virtual source to design a trumpet type of concentrator.

A trumpet concentrator 100 shown in FIG. 7 is convex instead of concave, and is a CHC type of design. Edge rays 110 take an infinite number of reflections to reach a target absorber 150. Like the $\theta_1$–$\theta_2$ concentrator 50, the target absorber 150 and source distribution 130 are both still on flat surfaces. The difference is that the target absorber 150 is in the source plane and the input distribution 130 acts as a virtual source. Again, the source brightness distribution is assumed to be known. For a truncated design, the height h is chosen and points A,A' are found such that all rays hitting the source pass between them.

The edge ray principle used in this case requires that the edge rays 110 hit the target absorber 150 after an infinite number of reflections. One observes that in classical designs of trumpet concentrators the edge rays 110 reflect toward "virtual" foci at the edge of the source distributions and keep getting closer and closer to the target absorber, but take an infinite number of reflections to get there. We can manipulate the edge ray 110 so it follows this pattern. The virtual foci indicate that the edge ray 110 reflects toward a point 125 behind the concentrator 100 and is not reflected inside the target 150 by one reflection. By choosing an origin 125 of our coordinate system at the edge of the source distribution and causing the edge rays 110 to be reflected towards the "virtual" foci we can design for an infinite reflection edge ray collector using a one-reflection design method. All that is required is that we define the acceptance angle $\theta_1(R, \phi)$ appropriately.

Figure 8A:
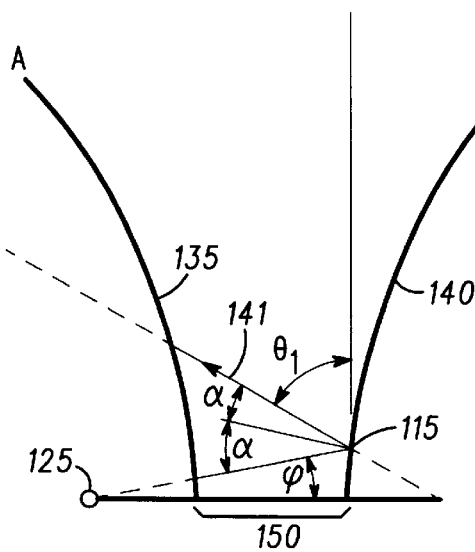
FIG. 8(a) rays coming from the opposite side of a reflector and FIG. 8(b) rays hitting the reflector directly.
Figure 8B:
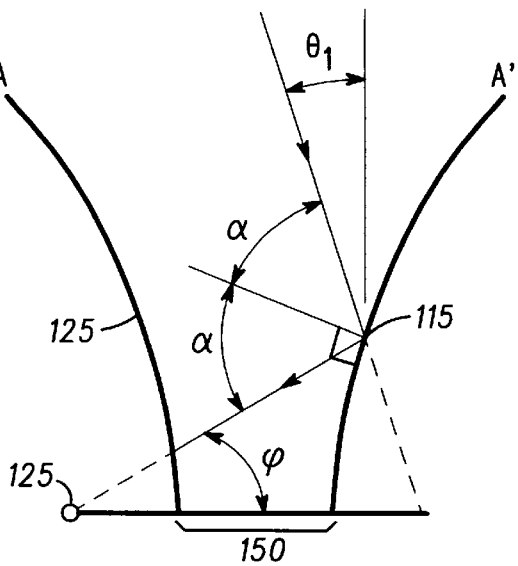
FIG. 8 illustrates multiple reflection designs of a trumpet configuration using a single reflection edge ray.

There are two parts along the integration curve that need to be considered. These two regions are depicted in FIG. 8. Starting from the origin 125, a ray 141 is drawn from an opposite focus 125 through a reflector 135. If this ray 141 does not pass through A,A', then the angle for $\theta_1(R,\phi)$ is given by the angle of this ray 141. This is because reflector 140 on the other side is sending all its edge rays towards this focus. If the ray from the opposite focus passes through A,A', then one finds the maximum angle onto the reflector 135 by raytracing backwards toward the source and until the biggest angle is found. This angle is used for the integration of Eqn. 5, the angle $\alpha$ is given by Eqn. 6.

The technique for this integration is to start from the outside edge of the reflector 140 and integrate inward because these points on the reflector 140 are known. The final target aperture 150 is arrived at from the integration and no bisection is required as in the $\theta_1$–$\theta_2$ case. Numerical integration of this equation gives back the classic trumpet designs that were derived using a flowline approach. Unfortunately, this method cannot analytically derive the trumpet shape as can the flowline approach. But it has the important advantage that it can tailor for non-uniform distributions that have not been possible before.

Since ideal trumpets have infinite extent, one sees that letting R go to infinity results in numerical difficulties. This approach will not cover such concentrators, since truncation is automatically built into the preferred design method. Design of ideal infinite concentrators requires a flowline approach. However, the integral method works for all practical applications.

3. Non-Flat Absorbers

Figure 9:
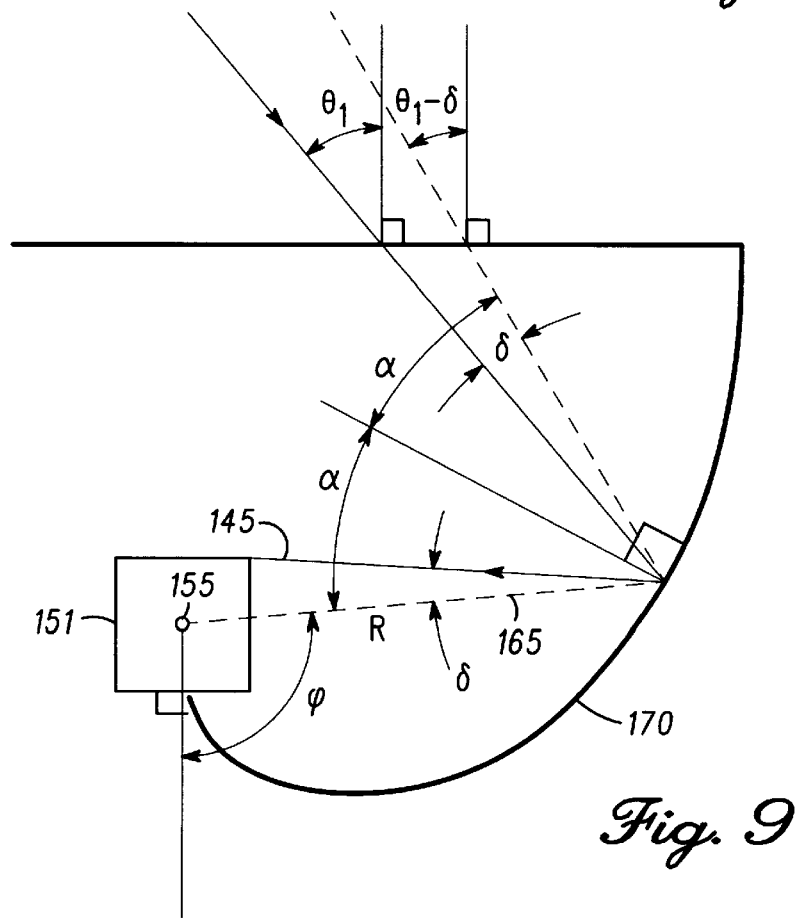
FIG. 9 illustrates a concentrator design using a center complementary edge ray for a non-flat absorber.

Generalizing to a non-flat absorber, one can follow the above described methodology. In FIG. 9, we show the design method for an arbitrary shaped convex absorber 151 using a CEC-type approach. The parameter $\delta(R,\phi)$ is the angle an extreme ray 145 from the absorber 151 makes at point R,$\phi$. If the absorber 151 is circular then center 155 of the absorber 151 is the optimal location for the coordinate origin and $\delta = \arcsin(\rho/R)$, where $\rho$ is the absorber radius. The coordinate origin is along vertical axis 160 of the absorber 151 for simplicity. $\theta_1$ is the extreme angle from the source distribution that hits and is obtained by raytracing backward, as described earlier. The edge ray 145 at $\theta_1$ should reflect so it hits just tangent to the top of the absorber 151. A complementary edge ray 165 is used which goes through the origin 155 as before resulting in an equation for $\alpha$, $$\alpha = \frac{\phi - \theta_1(R, \phi) + \delta(R, \phi)}{2} \qquad (9)$$

Figure 10:
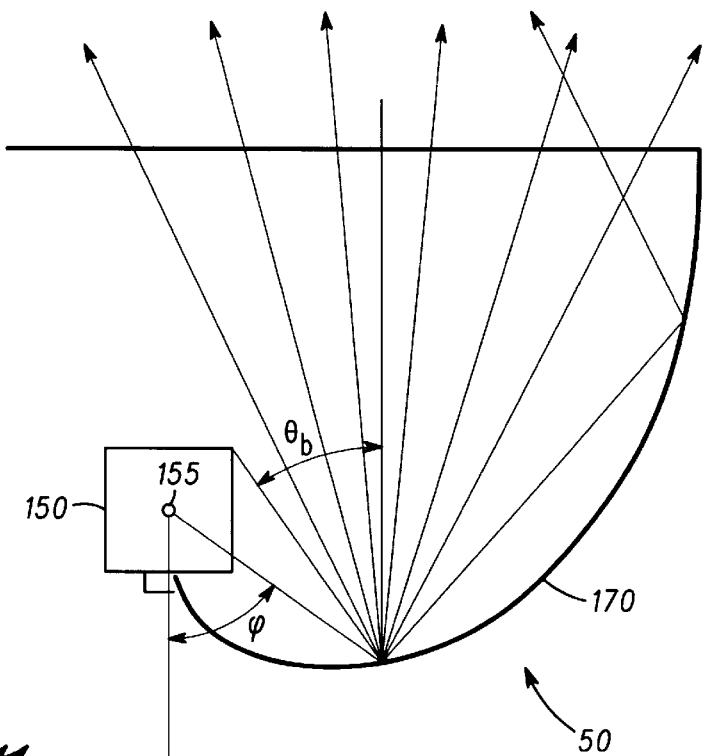
FIG. 10 illustrates a reverse ray tracing to find a maximum angle relative to the reflector with $\theta_1 < \theta_b$.

In such a methodology the absorber 151 can intercept rays from the source and prevent them from reaching reflector 170. Designing the reflector 170 to collect these rays results in an unnecessary loss in concentration. Thus, the problem is to find the extreme ray angle hitting the reflector 170 that is not blocked. FIG. 10 shows how to backward raytrace to find the maximum angle. With the angle $\theta_b$, the maximum angle that cannot hit the absorber 151, one searches between $-\pi/2$ and $\theta_b$ to find $\theta_1$. Note that if no light hits directly onto the reflector 170 from the source, then one raytraces backwards using multiple reflections until finding a ray that intersects the source. This requires that the integration start from the outside of the source and go inward, because otherwise the multireflection backward raytrace cannot be done as the reflector profile on top is as yet undetermined.

In the preferred embodiment, an involute is not used for the bottom of the concentrator 170 because the integral equation is defined for all $\phi$ and gives the maximum concentration. For flat phase space distributions, the integral method gives back the involute automatically; and the results are the same as those done using geometrical techniques.

The gap between the absorber 151 and the reflector 170 is not fixed and is determined by the value of R at $\phi=0$. A raytrace is required to see if there is significant gaploss.

The techniques described hereinbefore give the general method for design of the three major types of the concentrators 50, 100 and 170. The design equation can be modified to account for additional constraints, such as including the addition of a lens to the design, requiring that TIR be satisfied and using a graded index material.

Adding a lens (not shown) can allow the concentrator 50 to be much more compact. To account for the lens, $\theta_1$ and h are changed. The acceptance angle along the reflector $\theta_1$ is obtained by a backward raytrace through the lens to find the maximum angle that is inside the input distribution. The numerical integration proceeds as before. The new height h is found by determining how the truncation angle $\theta_t$ is deviated by the lens. This new angle is required to hit the edge of the absorber to find the optimal height. Shorter heights will result in loss of concentration as noted before.

Figure 11:
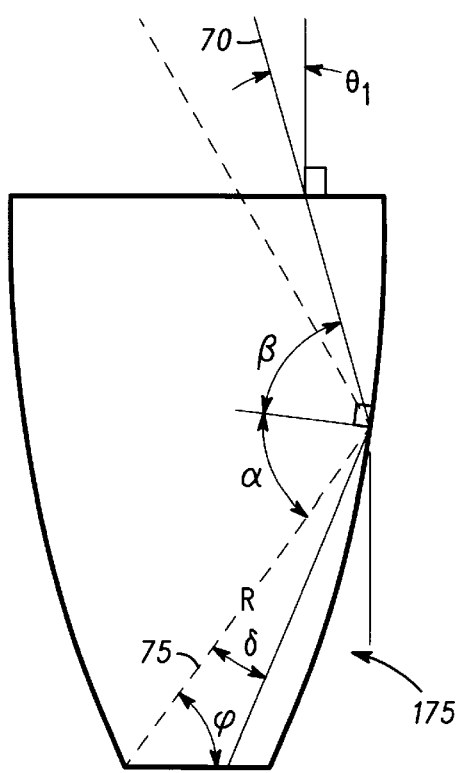
FIG. 11 illustrates the requirement of TIR, i.e., $\beta > \arcsin(1/n)$.

Imposition of a requirement that all rays satisfy TIR is used in dielectric concentrators to minimize reflection losses and heating. For the $\theta_1$–$\theta_2$ concentrator 50, the edge ray 70 is required to make an angle $\beta$ with the normal of the reflector 175 greater than the critical angle. In FIG. 11, we show how to require TIR. Requiring that $\beta \geq \arcsin(1/n)$ yields a new constraint on $\alpha$, $$\alpha \leq \frac{\pi}{2} + \phi - \theta_1 - \arcsin(1/n) \tag{10}$$

where n is the index of refraction of the medium. Again, the complementary edge ray 75 is used to simplify the geometry. Designing the concentrator 175 using a circular lens yields the same shapes as achieved using different techniques.

Figure 12:
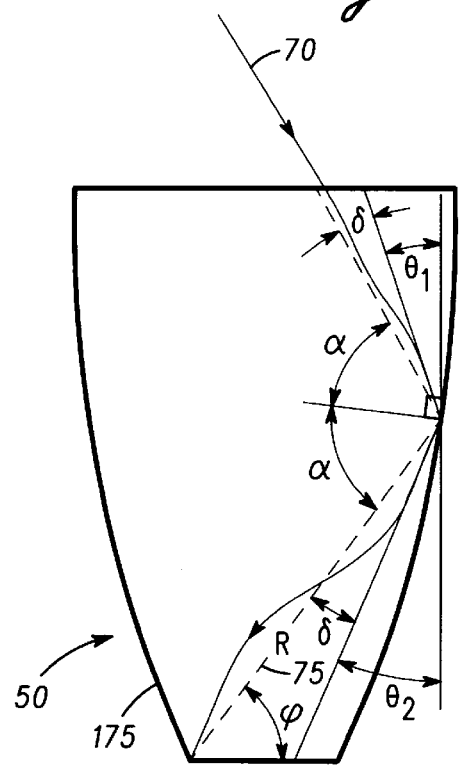
FIG. 12 illustrates a design in graded index material with a complementary edge ray.

Use of a graded index material can also be utilized (see FIG. 12), provided that one knows the index profile beforehand. The graded index material normally acts similarly to a lens and one finds $\theta_1$ from a backwards raytrace through the medium. The difference is that a raytrace to hit the edge of the absorber is also needed. In FIG. 12, one finds $\theta_2(R,\phi)$. The complementary edge ray 75 shows that Eqn. 7 gives $\alpha$ for all values of $\theta_2$.

B. Nonimaging Illuminators.

The method and design of nonimaging illuminators 180 are shown generally in FIGS. 20–25. The above described concepts for concentrators can also be extended to designs for these illuminators 180 as well. Nonimaging optics is a field developed originally with the goal of concentrating light with maximum efficiency. From reversing light ray paths, concentrators therefore can become ideal illuminators. The ideal is in the sense that all light emitted by a source 185 is outputted by the reflector 190 and the light exits in a well defined cone. The problem is that an illumination pattern on a target plane is fixed and one desires to change the pattern. Recent work has showed that a tailored concentrator can be used to illuminate a far away plane with constant illumination. The problem is that the reflector shape is much larger than the source and a method for target planes that are close to the source is not well developed.

A general integral method can be applied to nonimaging optics for maximizing concentration furthering the method for arbitrary source distributions, absorber shapes, and concentrator types. This technique can apply to illumination problems as well as to concentrators, and provides a way to place general illumination patterns on nearby target screens. Because a leading edge approach is used, one can completely eliminate the large gap between the source 185 and the reflector 180 present in previous trailing edge designs.

Figure 20:
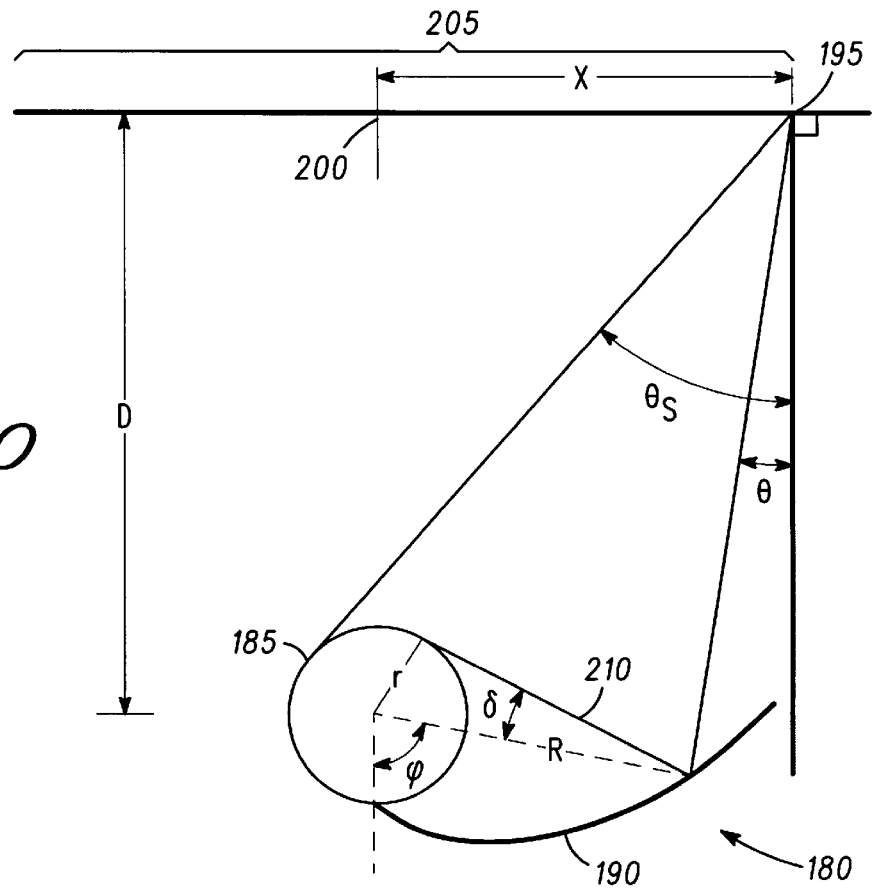
FIG. 20 illustrates the geometry used to design a general illuminator.

The geometry used to design a general illuminator is shown in FIG. 20. From the design concepts of the concentrators 50, we can express the basic differential equation for a tailored reflector:

$$\frac{dR}{d\phi} = R\tan\left(\frac{\phi + \delta(R,\phi) - \theta(R,\phi)}{2}\right) \tag{11}$$

The position on the reflector 190 in given in polar coordinates by R,$\phi$. The angle $\theta$ is the tailored acceptance angle this point. The size and shape of the source 185 is parameterized in $\delta$, which is the angle between rays at R,$\phi$ heading towards the coordinate origin 195 and passing tangent to the top of the absorber. All parameters in Equation 10 are known except for $\theta(R,\phi)$, which varies with the desired illumination. The only constraint is that $\theta$ and R increase as $\phi$ increases when tailoring the reflector 190.

To find $\theta$, one finds the corresponding position 200 on a target screen 205 X($\theta$) and requires that the power hitting that point fits a desired illumination pattern. With D the distance from source origin to the center of the target plane, X($\theta$, R,$\phi$) is given by, $$X = R\sin\phi + \tan\theta(R\cos\phi + D) \tag{12}$$

Applying boundary conditions to the design shows that there are three regions in the integration along $\phi$. These are 1) use of an involute to make sure that all light exits the illuminator 180, 2) designing part of the reflector 190 to normalize power at the center of the target, and 3) tailoring the reflector 190 to get general illumination along the target screen 205. These regions are explained below.

Figure 21:
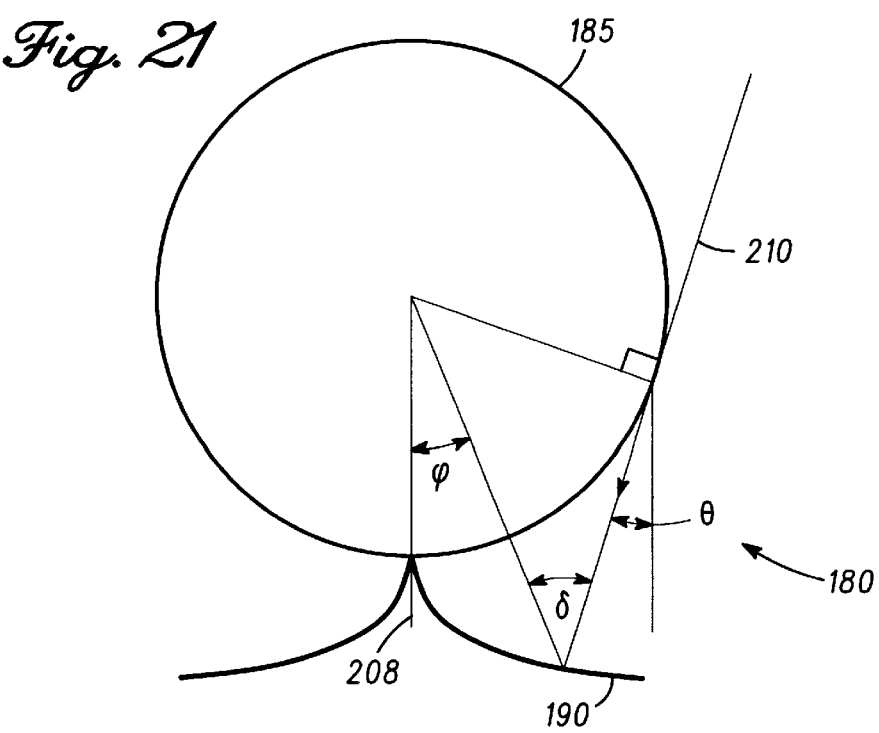
FIG. 21 illustrates the design geometry of the involute region of an illuminator.

1) The design of an involute 208 is done by forcing the leading edge ray 210 to reflect directly backwards just tangent to the source 185. This is shown in FIG. 21 and prevents any light from returning to the source 185 eliminating power losses. The value for $\theta=\phi-\delta(R,\phi)$. This section of the integration continues until X($\theta$)$\geq 0$.

2) The general illumination pattern on a target plane requires, $$P(X) = P(0)f(X) \tag{13}$$

where P(X) is the power hitting on the plane at point X and $f(X)$ is the shape of the power distribution curve. The design uses X($\theta$)=0 to define $\theta$ until the target center power satisfies, $$P(0) \geq P_2(X)/f(X), X > 0 \tag{13}$$

where $P_2$ is the power directly from the source 185 and the reflector profile integrated in region 1 and 2. The basis of tailoring is that power can be added to P(X), but if $P_2(X) > P(0)f(X)$, then there will be an excess output at that point.

Designs which do not include or only part of region 2 can have points of excess power. Raytraces will determine whether these deviations are acceptable. Increasing the value of P(0) gives more uniformity but power conservation limits the range in X that can be tailored.

3) After normalizing P(0) from integration regions 1 and 2, we can start to tailor the general illumination pattern. For each point R,φ, we find θ such that $P(X)=P(0)f(X)$. There are limits on the variability of $f(X)$ and these arise because one cannot have excess light hitting at any point after tailoring. For all points Y>X, $f(Y)$ must satisfy to avoid any excess illumination, $$f(Y) > P_3(Y)/P(0) \tag{15}$$

where $P_3$ the power arriving because of the reflector profile extended to the current integrating position. Finding P(X) can be somewhat complicated. It is in general given by, $$P(X) = \int_\theta^{\theta_s} \frac{Id\beta \rho^{n(\beta)} \cos\beta}{\pi d(\beta)} \tag{16}$$

where I is the power emitted per unit length from the source 185, β is angle of a ray leaving at point X and returning to the source 185, d(β) is the optical path length for the ray to reach the source, n(β) is the number of reflections required to arrive at the source, ρ is the reflectivity of the reflector 190, and $\theta_s$ is the angle to the edge of the source. All the parameters are found in terms of the variable θ. Finding the proper edge ray angle requires varying θ until one satisfies Equation 13. For a source close to the target, evaluating P(X) requires backward raytracing and requires considerable computation.

The tailoring of the illuminator 180 continues until a reflector size limit is reached. To ideally determine the illumination pattern requires that the reflector 190 extends from the source 185 to target. This is impractical in most cases and severe truncation causes only tails in the illumination seen. At the final point in the design, evaluating $X(\theta_{end})$ gives the region on the target screen that is unaffected by truncation.

Figure 22:
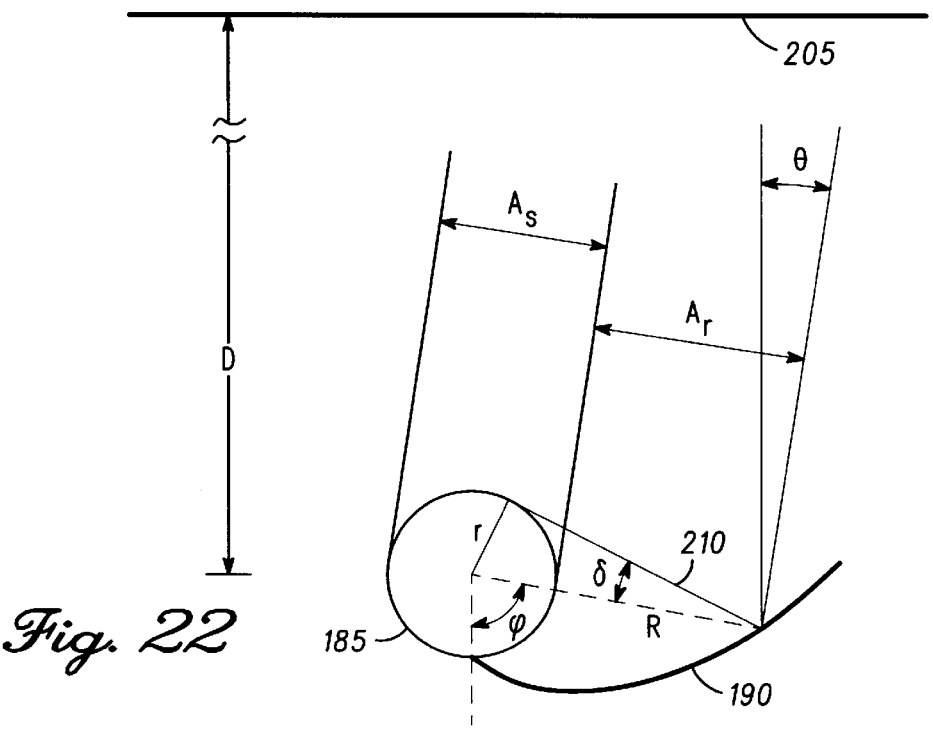
FIG. 22 illustrates the geometry for distant target illumination.

The simplest example of distant target illumination is for D>>R, a circular-cylindrical source (δ=arcsin(r/R)), and constant illumination ($f(X)=1$). Assuming that the contribution of multiple reflections is negligible (ρ≅1), simplifies Equation 16 to give, $$P(X) = \frac{I[A_s(\theta) + \rho A_r(\theta)]\cos^2\theta}{4\pi r D} \tag{17}$$

where $A_s(\theta)$ is the projected area seen directly from the source at angle θ, $\theta_r(\theta)$ is the projected area seen by reflection, and X=D tan(θ). This geometry is shown in FIG. 22. The projected areas are, $$A_s(\theta)=2r \tag{18}$$

$$A_r(\theta)=R\sin(\phi+\theta)-r \tag{19}$$

Integrating Equation 10 until θ=0 using θ=φ−arcsin(r/R) gives the reflector profile in region 1 outlined above. The next step is to find when to stop the integration of region 2. Requiring that the now excess illumination is produced, P(O)>P(ΔX), gives the following condition on the projected areas, $$\frac{d}{d\theta}(A_s(\theta) + A_r(\theta))\cos^2(\theta)_{\theta=0} \leq 0 \tag{20}$$

Figure 23:
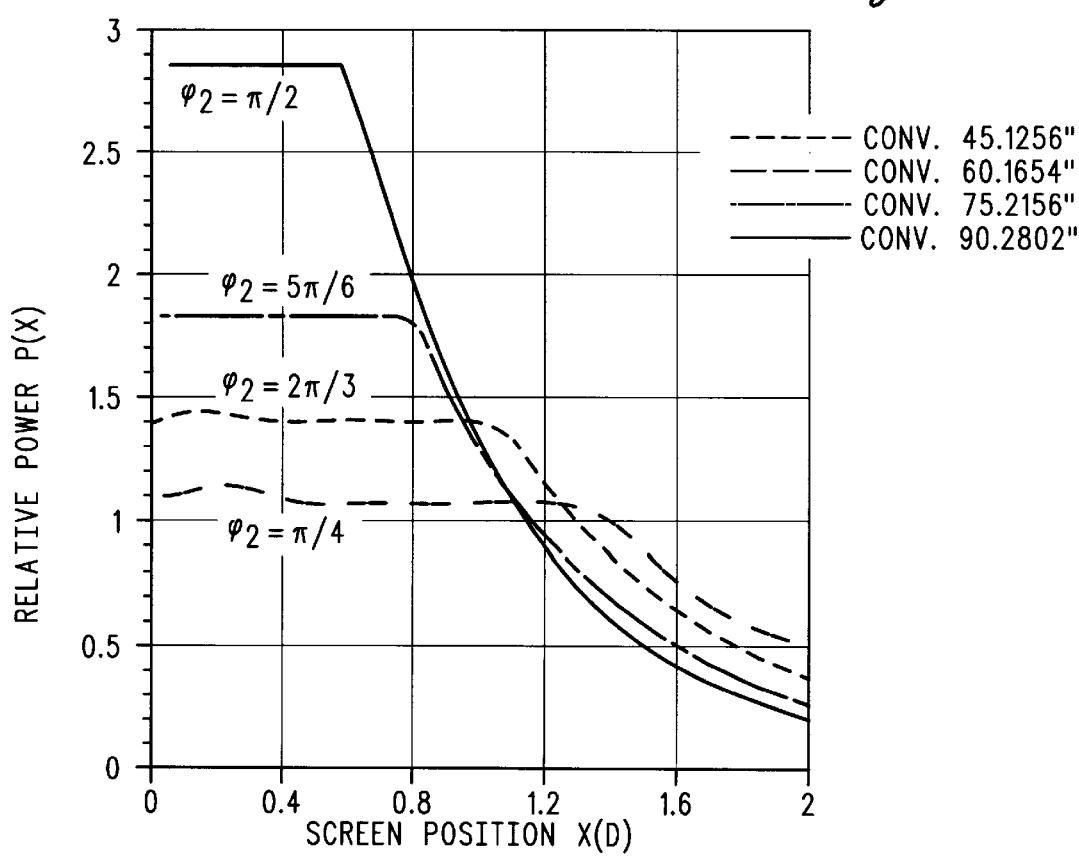
FIG. 23 shows integration curves for integration within angular region two where power is normalized at the target center.
Figure 24:
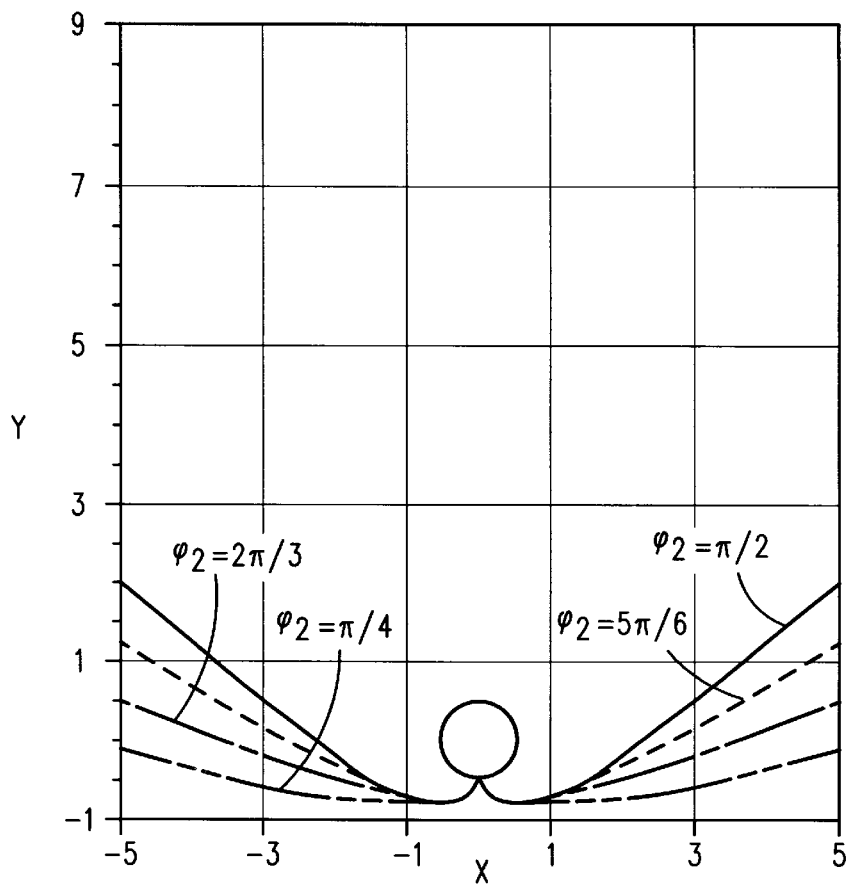
FIG. 24 shows intensity profiles for illuminators with the angular stopping points in FIG. 23.

This condition sets θ=0, while φ≦π/2. Satisfying this condition causes $A_r(0) \cong 1.8 A_s(0)$ and greatly reduces the size of the illumination pattern on a distant screen. By stopping the integration at φ<π/2, one finds that the range can be extended with little excess seen on the screen near the center. The integration in region 3 finds θ such that $A(\theta) \cos^2\theta = A(0)$. The integrated curves for various region 2 stopping points are shown in FIG. 23. The curves are truncated so that the width of the reflector is 10r. The performance of each illuminator is shown in FIG. 24. As can be seen, lowering P(0) causes a higher relative excess on the screen but extends the range of constant illumination. These shapes indicate that the power and range of constant illumination can be changed to satisfy various demands. The maximum design angle for an untruncated reflector can be found from energy conservation. The relationship is, $$I = P(0) \int_{-X_{max}}^{X_{max}} dx = 2DP(0)\tan\theta_{max} \tag{21}$$

For the perfect irradiance where region 2 stops at φ=π/2, we see in FIG. 24 that $\theta_{max}=47.7°$. Eliminating region 2 completely yields $\theta_{max}=70.3°$. Truncation reduces the design range and the maximum angle of constant irradiance to $|\theta(R_{end}, \phi_{end})|$. Since the range of illumination is proportional to $\tan\theta_{max}$, this difference gives quite large design freedom. Changing the amount of truncation has little effect on this value.

This new illumination system design method is much more general than previous methods and results in much more compact shapes with no source-reflector gap. The method can be developed for noncircular illuminating source distributions by changing δ(R,φ) appropriately to a new form that fits the shape of the source 185.

For a finite separation between source and target plane, the design method includes the condition that for general illumination, the design for points near the center of the target screen will not cause excess power to strike points further along the concentrator 50. If the source distribution is not uniform, one can add a relative power weighting to the integral that is source dependent in Equation 16. The rest of the technique remains the same. Three dimensional designs for rotationally symmetric systems can be designed using the two dimensional equation. Evaluating the P(X) involves a double integral over the collected solid angle.

The following nonlimiting examples illustrate various aspects of the invention.

EXAMPLE 1

This example is directed to the analytic solution for a $\theta_1-\theta_2$ concentrator where $\theta_1<\theta_2$. Combining Eqns. 5 and 7 and integrating yields the equation for R(φ) for π/2−φ>θ$_2$, $$\ln\left(\frac{R(\phi)}{L_2}\right) = \int_0^\phi d\phi' \tan\left(\phi' + \frac{\theta_2 - \theta_1}{2}\right) \tag{22}$$

For $\theta_1$ and $\theta_2$ constant, this equation gives the analytic solution for R(φ), $$R(\phi) = L_2 \frac{\cos\left(\frac{\theta_2 - \theta_1}{2}\right)}{\cos\left(\phi + \frac{\theta_2 - \theta_1}{2}\right)} \quad (23)$$

which is a straight line whose direction corresponds to $\phi = \pi/2 - (\theta_2 - \theta_1)/2$. When $\pi/2 - \phi \leq \theta_2$, Eqns. 5 and 6 yield, $$\ln\left(\frac{R(\phi)}{R(\pi/2 - \theta_2)}\right) = \int_{\pi/2 - \theta_2}^{\phi} d\phi' \tan\left(\frac{\pi}{4} + \frac{\phi' - \theta_1}{2}\right) \quad (24)$$

Evaluating the integral and simplifying gives, $$R(\phi) = \quad (25)$$

$$R(\pi/2 - \theta_2) \frac{\cos^2\left(\frac{\pi}{2} - \frac{\theta_2 + \theta_1}{2}\right)}{\cos^2\left(\frac{\pi}{4} + \frac{\phi - \theta_1}{2}\right)} = R(\pi/2 - \theta_2) \frac{\cos(\theta_1 + \theta_2) - 1}{\sin(\phi - \theta_1) - 1}$$

which is a parabola with direction of axis corresponding to $\phi = \pi/2 + \theta_1$. Using $\phi = \pi/2 - \theta_1$ as the final point on the curve determines the height for the ideal concentrator. The curve given in rectangular coordinates with its origin shifted to the center of the target is given by $(R(\phi)\cos\phi - L_2/2, R(\phi)\sin\phi)$. The entrance width $L_1$ equals $L_2 \sin\theta_2/\sin\theta_1$, which matches exactly with the theoretical limit.

EXAMPLE 2

Two-Stage Collector

In prior two-dimensional solar collector systems, using a cylindrical circular mirror had limited utility because of the significantly lower concentration of 2–3 as compared to the value of 25–30 from a parabolic trough. The desirable symmetry properties of the circular mirror allow the primary mirror to be fixed, and only the absorber has to pivot to track the sun. However, this advantage was offset by the large aberration of the cylindrical mirror. A nonimaging secondary can restore some concentration lost by the aberrations and this example concerns designing an appropriate secondary.

Figure 13:
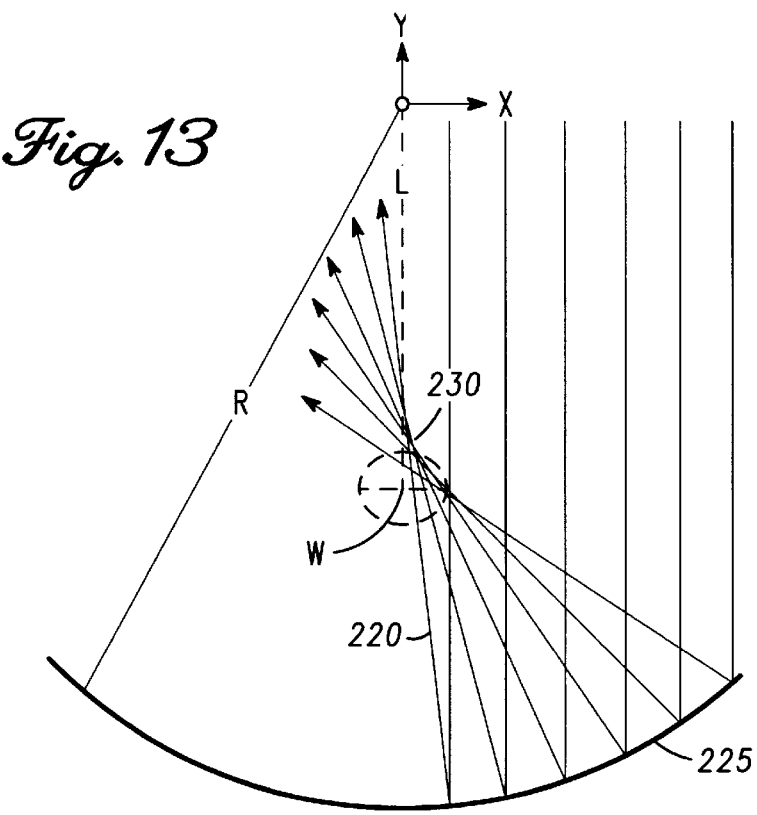
FIG. 13 illustrates rays reflected off an optical circular arc.

Designing the secondary requires that the location and aperture of the secondary be specified. This involves an elementary study of how rays 220 reflect off a circular arc 225. One can identify an envelope pattern 230 to which the rays are tangent as shown in FIG. 13. This envelope 230 is very important for positioning the aperture of the secondary. We find the equation for the curve by intersecting two parallel rays separated by an infinitesimal amount after they reflect off the primary. The parameterized equations for the envelope in FIG. 13 in rectangular coordinates are, $$X = R\sin^3\gamma \quad (26)$$

$$Y = -\frac{3}{2}R\cos\gamma + R\cos^3\gamma \quad (27)$$

where R is the primary arc radius of curvature and $\gamma$ defines the angular position the rays 220 reflect from the primary (the arc 225) and the position on the envelope 230 that it is tangent. Note that when $\gamma$ is about zero, the ray 220 passes through the paraxial focus. To find where to place the secondary aperture, each edge is required to intersect the envelope 230. For a given width of the secondary W=2X, the length of the optimal pivoting leverarm is L=−Y. Maximum collection occurs for this leverarm length because the rays 220 do not cross the envelope 230 to which they are tangent. On each side of the symmetry axis is an envelope function, so the rays 220 tangent to one side pass through the envelope 230 on the opposite side. For smaller leverarms more of the rays 220 passing through the opposing envelope 230 are lost while no more rays are collected to compensate for them. As is obvious from FIG. 13, the density of rays 220 tangent to the envelope 230 is much higher than of those passing through it, Thus, increasing the leverarm, so that the width no longer intersects the envelope 230 results in much more loss than gain.

Figure 14:
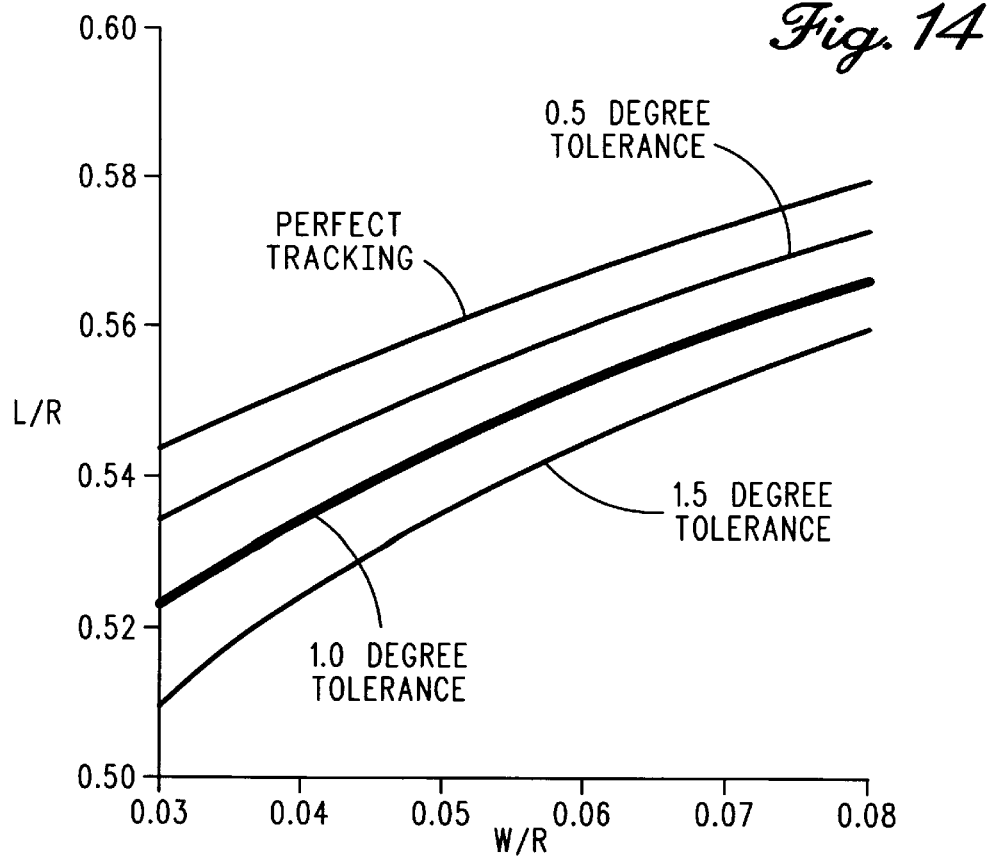
FIG. 14 illustrates the effect of tracking tolerances on proper secondary positioning.
Figure 15:
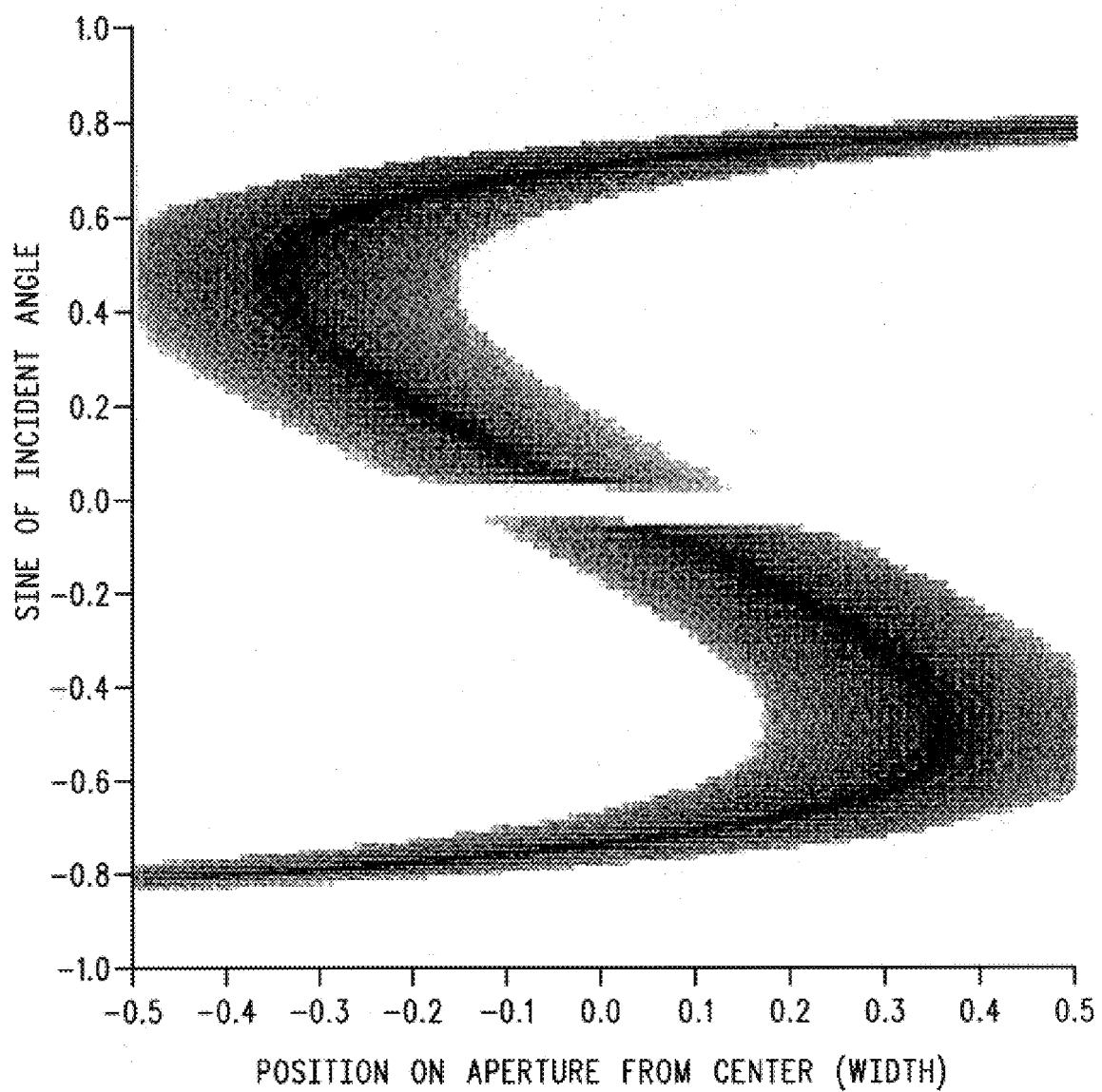
FIG. 15 illustrates brightness distribution hitting the aperture of a secondary portion of the design.

The angular spread of the sun and tracking tolerances are now added. A tracking angle $\theta_{track}$ is defined to be the maximum angle of deviation of the ray 220 off the primary mirror (the arc 225) for any reason. These include the angular spread of the sun, tracking tolerances, and non-specular reflection off of the primary mirror arc 225. This is modeled by rotating the envelope functions by $\theta_{track}$ and requiring the intersection as before. Raytraces show that this model produces the optimum leverarm. As $\theta_{track}$ increases, the L decreases and results in lost collection. FIG. 14 shows L as a function of W, R and $\theta_{track}$. We find that W/R in the range of 0.04–0.05 works best and allows the primary mirror to be seen well. A value of $\theta_{track}$ of 1 degree (18 mradians) gives very wide tolerances and little loss in performance. This procedure differs from parabolic troughs in that the tracking tolerances are input parameters rather than set by the design.

A scale for the system is chosen by placing the secondary inside a 150 mm O.D. evacuated glass tube to minimize thermal losses in the system. Placing the aperture at the center of the tube gives W=143 mm (5.6"). Setting R=3.23 m (127"), we find L=1.74 m. All the light rays incident on a 55 degree arc of the primary are collected on the secondary aperture. This gives a concentration of the primary of twenty one. Next, the brightness distribution onto the secondary aperture is traced and, from FIG. 15, one finds a very non-uniform pattern. A Gaussian distribution of angular deviations is used with a standard deviation of 0.5 degrees. This model assumes that the tracking has no bias and other sources of spreading are uncorrelated.

Figure 16:
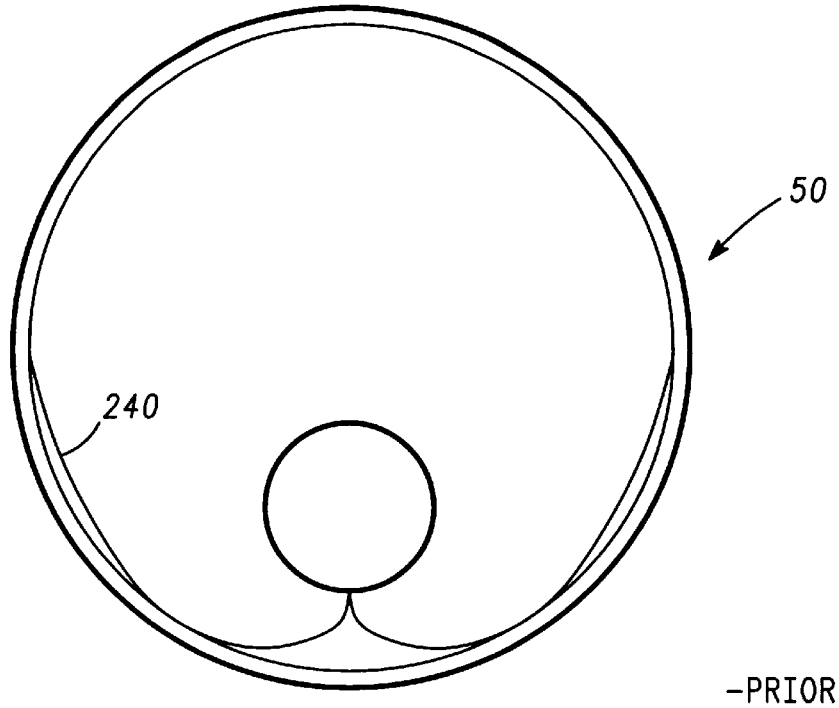
FIG. 16 illustrates a standard 55° acceptance CPC with C=1.15.
Figure 17:
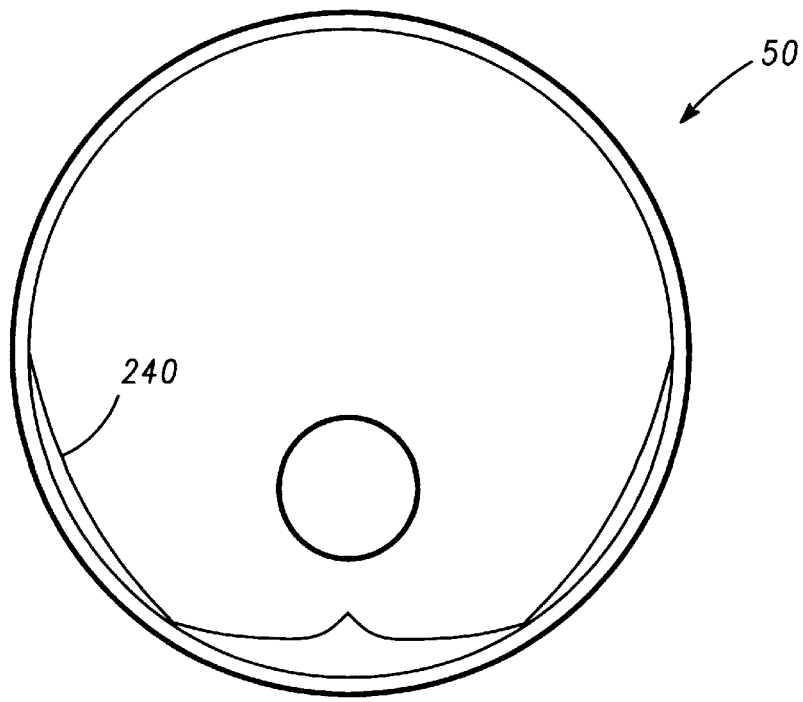
FIG. 17 illustrates a tailored concentrator with C=1.45.
Figure 18:
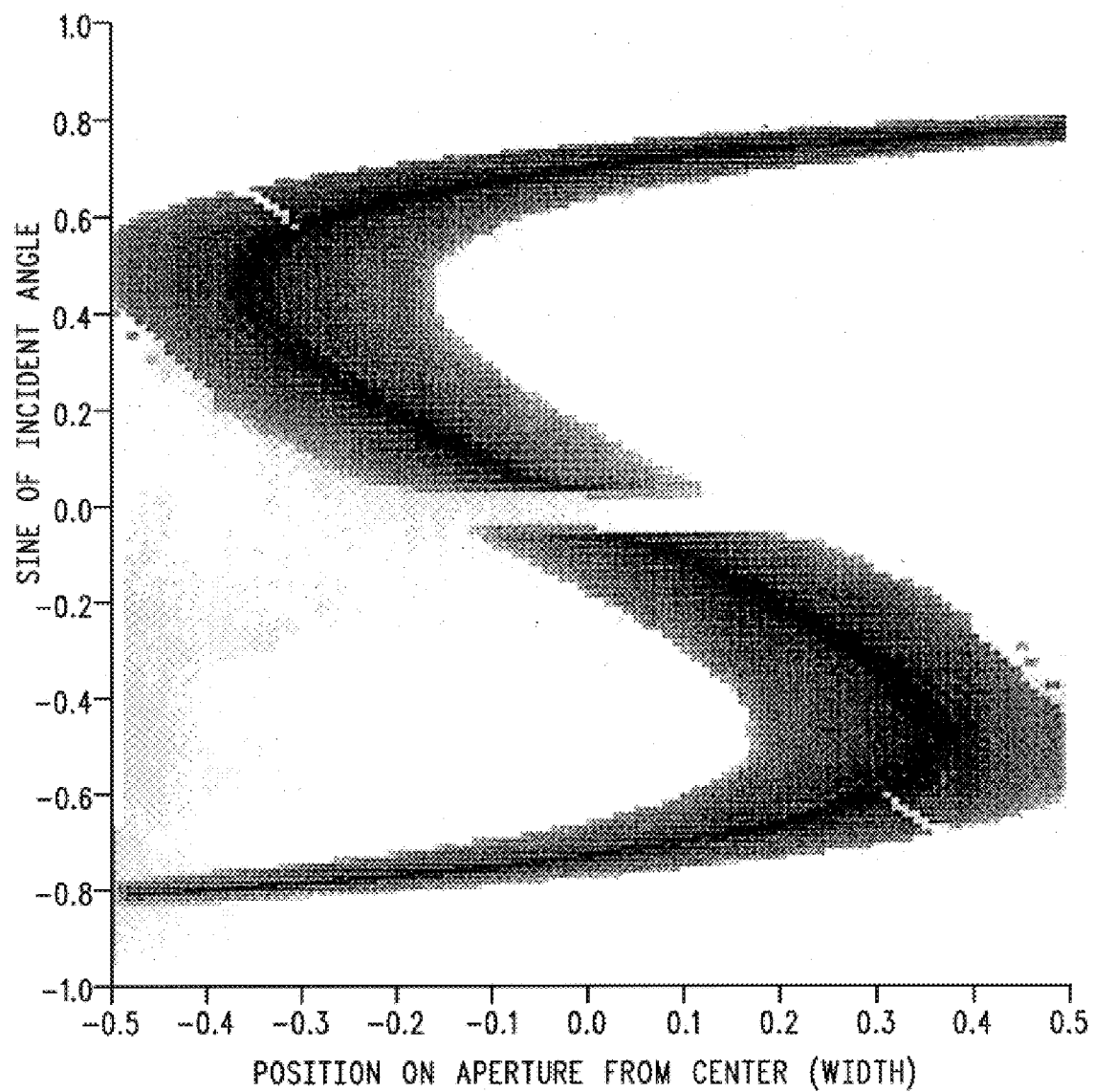
FIG. 18 illustrates a brightness distribution from a primary portion collected by a tailored concentrator.
Figure 18:
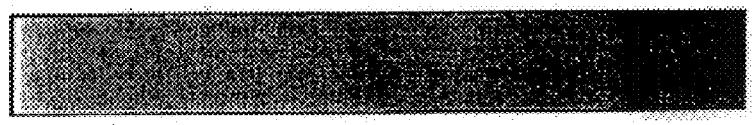

By calculating the phase space area that needs to be collected, the theoretical limit to concentration of the secondary is found to be over 2.5. A prior art standard CPC with a 55 degree acceptance and no reflector-absorber gap with aperture at the center of the evacuated tube only concentrates to 1.15 because of truncation losses. This concentrator 50 is shown in FIG. 16. The main reason for the shortfall is that there are gaps in the brightness distribution and the maximum angle as a function of position on the aperture also varies. Using the design technique for circular absorbers, the acceptance angle at each point along the reflector 240 is found through reverse raytracing. The resulting concentrator 50 gives a concentration of 1.45 and is shown in FIG. 17. The large gap is acceptable as a raytrace of the design shows a loss of only 0.1%. In FIG. 18, we show the brightness distribution hitting the secondary that is collected.

Figure 19:
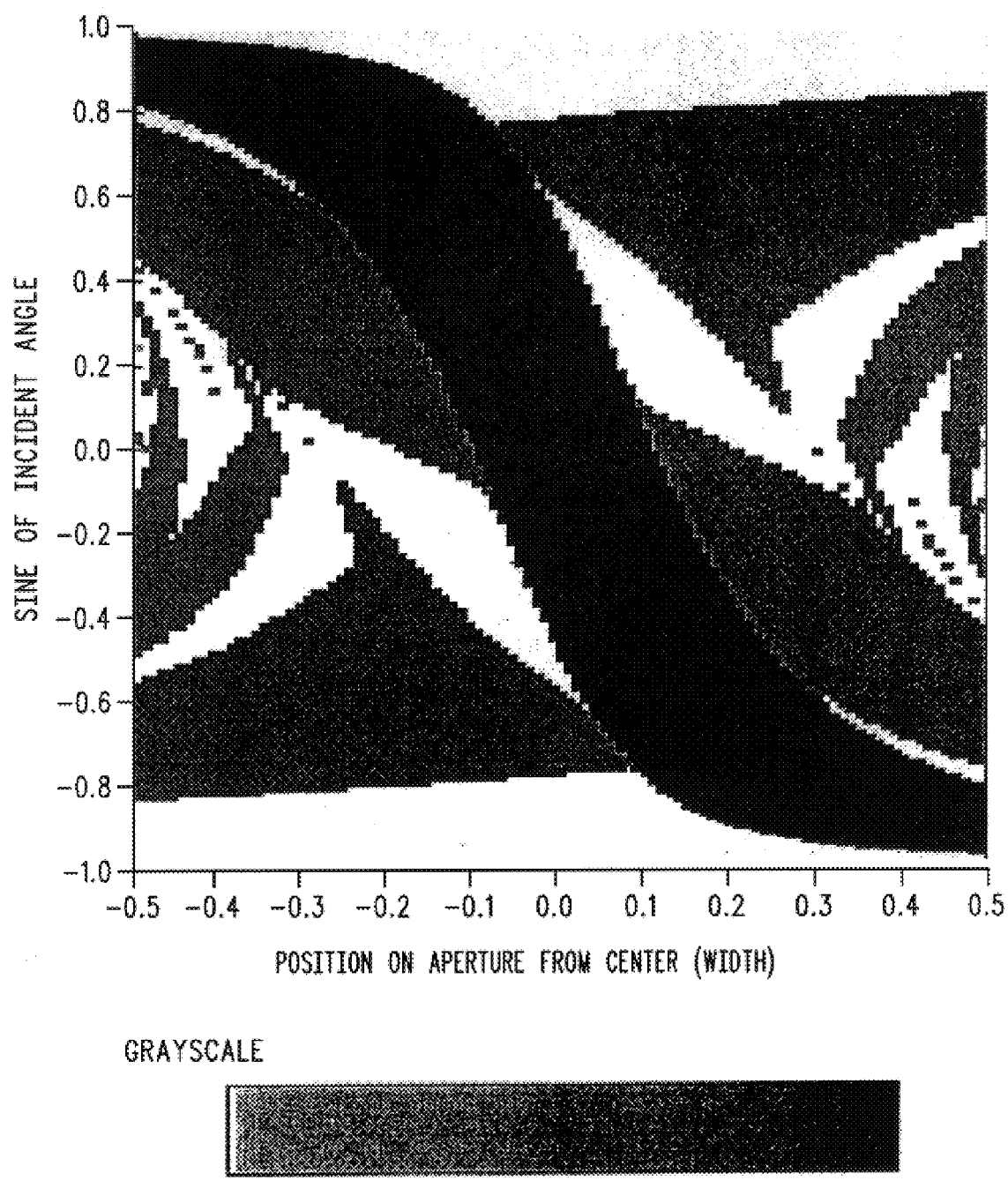
FIG. 19 illustrates a brightness distribution from a Lambertian source collected by a tailored concentrator; black areas indicate absorber hit directly; gray areas indicate light collected after one or more reflections; and white indicates rays not collected.

To see how tailoring effects the phase space that is collected, FIG. 19 shows which parts of a Lambertian distribution are collected. Also, each brightness bin has a grayscale level associated with the number of reflections undergone before hitting the absorber. The direct radiation onto the absorber does not hit the reflector and therefore cannot be tailored. This results in a 20% loss in concentration. Each multiple reflection region is separated by a gaploss region. Because the system collects most of the input distribution in one or zero reflections a large gap gives no significant loss. In cases like this, leaving the gap as a variable parameter is the only way to achieve maximum concentration. Staring with an absorber-reflector gap condition would limit concentration to 1.25.

This new secondary gives the system an overall concentration of 30.5. The concentration is slightly higher than that obtained using parabolic troughs and the system has much higher tracking tolerances. Only the secondary needs to pivot to track the sun, not the primary mirror.

EXAMPLE 3

Constant Illumination From A Cylindrical Source

Figure 25:
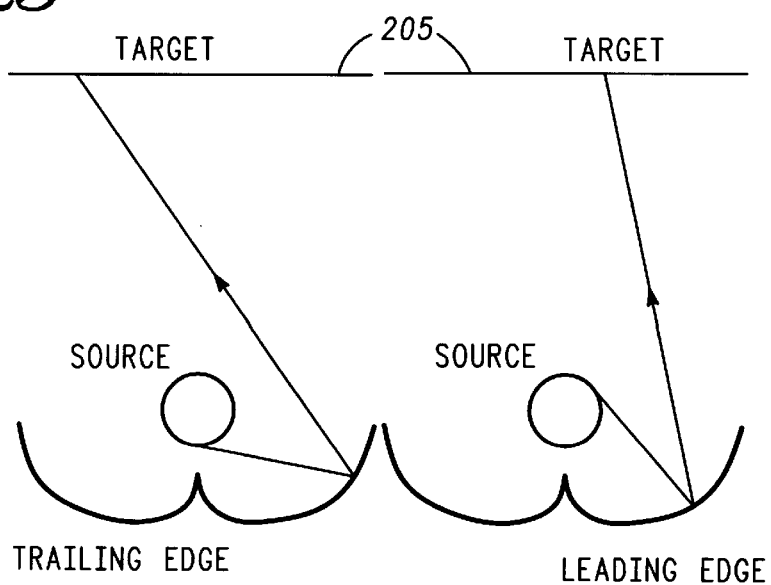
FIG. 25 illuminates the difference between trailing edge and leading edge design methodologies.

In prior work on illumination design, the reflector size in the illuminator system is much larger than the source. Part of the problem is the large gaps required when using a trailing edge design which requires a gap of several source diameters. With no gap, there is no trailing edge ray, and thus there can be no tailoring. FIG. 25 shows the differing approach to trailing and leading edge illumination design. The trailing edge, CEC type design, method functions by tailoring the illumination to the opposite side of a target screen 205, while the leading edge, a CHC type, functions by tailoring to the same side of the target screen 205. The advantage of a leading edge is that it requires no gap to function.

The use of a circular geometry and a far away target screen 205 results in the design geometry shown in FIG. 22. Note that the sign of θ is opposite that of the conventional nonimaging concentrators 50. This gives the basic design, $$\frac{dR}{d\phi} = R\tan\left(\frac{\phi + \delta(R) - \theta(R, \phi)}{2}\right) \quad (28)$$

where r is the radius of the cylindrical source 185, δ=arcsin (r/R) and the origin of the reflector shape profile is at the source center. There are three regions of interest in the design: 1) the involute requires that all light from the source 185 is emitted by the illuminator system, 2) this region tailors the center power distribution so that near to constant or constant illumination can be achieved on the target screen 205, and 3) the tailoring begins at points other than the center.

For a far away target, D>>R, the first region of integration is simple. One finds θ according to the geometry shown in FIG. 21. With θ=δ−φ, one integrates until θ=0. The conventional string method for finding an involute can be used here as well.

The second region normalizes the power at the center of the target screen 205 appropriately. Using the projected area of the source seen at various angles for the current reflector, we want to satisfy the condition P(0)>P(θ) for all θ so that constant illuminance can be achieved by tailoring. Using Eqns. 17 to 19, we find that P(θ) is, $$P(\theta) = I(2r + \rho(R\sin(\phi + \theta) - r))\cos^2\frac{\theta}{4\pi rD} \quad (29)$$

The condition to be satisfied is that P(Δθ)≦P(0). This condition gives the stopping point of integrating with θ=0 at $\phi_2=\pi/2$. Stopping before this point lowers P(0) and causes some over-illumination at various points on the target screen 205. This arises because tailoring adds power to a spot on the target screen 205, but there is nothing that can be done to reduce power hitting onto a given point.

The third region is tailored by finding θ such that P(θ)=P(0). The integration at this region continues until the reflector 190 meets set size constraints. The requirements to check that the design will work properly is that dθ/dφ≧0 and dR/dφ≧0.

Various illuminators are shown in FIG. 24. These show the profiles for various $\phi_2$ cutoffs in region 2. The shapes are truncated so that the reflector width is five times the source diameter. FIG. 23 shows these illuminator performance on a distant screen. For $\phi_2$ near π/2, we get higher illumination but the spread is less. Lowering $\phi_2$ gives wider spread to the illuminance pattern, but there are some deviations from non-uniformity up to a maximum of 10%.

While preferred embodiments of the invention have been shown and described, it will be clear to those skilled in the art that various changes and modifications can be made without departing from the invention in its broader aspects set forth in the claims provided hereinafter.

What is claimed is:

1. A nonimaging concentrator of light, comprising:

a two dimensional reflector shape having a longitudinal axis, said reflector shape defined by solutions for all points along the two dimensional reflector shape of a differential equation of polar coordinates:

$$\frac{dR}{d\phi} = R\tan\alpha$$

where R is a radius rector from an origin to a point of reflection of a light edge ray from the two dimensional reflector shape and φ is an angle between the R vector and a reference direction and coordinates (R, φ) represent a point on said reflector shape and α is an angle the light edge ray from an origin point makes with a normal to said two dimensional reflector shape; and said two dimensional reflector shape defined by a reflector curve which allows the light edge ray on said two dimensional reflector shape to vary as a function of position, thereby providing a plurality of edge rays for collection by the concentrator.

2. The nonimaging concentrator as defined in claim 1 wherein the concentrator is a compound elliptical concentrator (CEC) wherein α has the following functional behavior, $$\alpha = \frac{\pi}{4} + \frac{\phi - \theta_1(R, \phi)}{2} \text{ if } \theta_2 > \frac{\pi}{2} - \phi$$

where $\theta_1$, is a maximum angle of light rays striking an entrance aperture of said concentrator and $\theta_2$ is a maximum angle of the light rays leaving an exit aperture of said concentrator.

3. The nonimaging concentrator as defined in claim 1 wherein a three dimensional shape is selected from the group consisting of the shape formed by rotating the two dimensional reflector shape about the longitudinal axis and translating the two dimensional reflector shape perpendicular to a plane of the shape.

4. The nonimaging concentrator as defined in claim 1 wherein the concentrator is a compound elliptical concentrator (CEC) wherein α has the following functional behavior:

$$\alpha = \phi + \frac{\theta_2 - \theta_1(R,\phi)}{2} \text{ if } \theta_2 < \frac{\pi}{2} - \phi$$

where $\theta_1$, is a maximum angle of light rays striking an entrance aperture of said concentrator and $\theta_2$ is a maximum angle of the light rays leaving an exit aperture of said concentrator.

5. The nonimaging concentrator as defined in claim 1 wherein said concentrator is a compound hyperbolic concentrator (CHC) and solutions to $dR/d\phi = R \tan \alpha$ are determined in two parts over angles $\phi$, a first part uses an angle $\theta_1$ defined as the maximum angle of light rays striking an entrance aperture obtained by starting from an origin at an edge of a source distribution, drawing a ray from an opposite source edge through said reflector curve with the ray not passing though the region between entrance edge points A and A' defining said entrance aperture and in a second part the $\theta_1$ is defined by a second light ray from the opposite source edge passing between A and A' and raytracing backwards toward the source until the largest angle is founds and $\alpha$ is defined by, $$\alpha = \frac{\pi}{4} + \frac{\phi - \theta_1(R,\phi)}{2}.$$

6. The nonimaging concentrator as defined in claim 5 wherein the solutions to $dR/d\phi$ commence with an outside edge of the reflector curve and continue inwardly.

7. The nonimaging concentrator as defined in claim 1 wherein an absorber is not flat and said $\alpha$ is defined by, $$\alpha = \frac{\phi - \theta_1(R,\phi) + \delta(R,\phi)}{2}$$

where $\theta_1$ is a maximum angle of the light rays striking an entrance aperture of said concentrator and $\delta(R,\phi)$ is an angle the extreme edge ray makes at the point $(R,\phi)$.

8. The nonimaging concentrator as defined in claim 7 wherein the absorber is circular and $\delta = \arcsin(\rho/R)$ where $\rho$ is a radius of the absorber.

9. The nonimaging concentrator as defined in claim 1 further adding a lens and the light edge ray is defined by a backward raytrace through the lens determining the maximum angle inside a source distribution.

10. The nonimaging concentrator as defined in claim 1 and said reflector shape causing all light rays to satisfy total internal reflection such that $\alpha$ is defined by, $$\alpha = \leq \frac{\pi}{2} + \phi - \theta_1 - \arcsin(1/n)$$

where $\theta_1$ is a maximum angle of the light rays striking an entrance aperture of said concentrator and n is an index of refraction of a medium within said concentrator.

11. The nonimaging concentrator as defined in claim 10 wherein the n is a variable value.

12. The nonimaging concentrator as defined in claim 1 further including a nonimaging secondary element for restoring aberrational losses in concentration.

13. The nonimaging concentrator as defied in claim 12 wherein the location and aperture of said nonimaging secondary element is defied by an envelope curve rotated by $\theta_{track}$ which includes all angular deviations within said concentrator and the envelope is expressed as:

$$X = r\sin^3\gamma$$

$$Y = (-3/2)r\cos\gamma + r\cos^2\gamma$$

where r is a primary arc radius of a curvature and $\gamma$ defines an angular position a ray reflects from said reflector shape and a position on said envelope to which it is tangent.

* * * * *

UNITES STATES PATENT AND TRADEMARK OFFICE
CERTIFICATE OF CORRECTION

PATENT NO. : 5,971,551

DATED : October 26, 1999

INVENTORS: Roland Winston and Gerard Jenkins

It is certified that an error appears in the above-identified patent and that said patent is hereby corrected as shown below:

In column 16, line 32, delete "$r\cos^2\gamma$" and insert --- $r\cos^3\gamma$ ---.

Signed and Sealed this

Eighth Day of May, 2001

Attest:

NICHOLAS P. GODICI

Attesting Officer    Acting Director of the United States Patent and Trademark Office